United States Patent

Stoffel

[15] 3,695,697

[45] Oct. 3, 1972

[54] CONTROLLED MEMORY KEEPER

[72] Inventor: Robert W. Stoffel, Ferndale, Mich.

[73] Assignee: Allied Chemical Corporation, New York, N.Y.

[22] Filed: Oct. 8, 1970

[21] Appl. No.: 79,097

[52] U.S. Cl..................................297/389, 297/385
[51] Int. Cl...............................................A47c 31/00
[58] Field of Search...........297/388, 389; 244/122 B; 242/107 SB; 160/178 R, 178 C; 24/171, 129 D, 126 R, 136 R, 132 R

[56] References Cited

UNITED STATES PATENTS 3,040,403    6/1962    Viol et al. ..............160/178 C
3,439,932    4/1969    Lewis et al..................297/389

FOREIGN PATENTS OR APPLICATIONS 1,006,420    9/1965    Great Britain.........160/178 R
1,049,774    11/1966    Great Britain.............297/388

Primary Examiner—Bobby R. Gay
Assistant Examiner—Darrell Marquette
Attorney—Jonathan Plaut

[57] ABSTRACT

A movable gripping device which is used with a shoulder strap in a motor vehicle safety seat belt restraint system.

10 Claims, 4 Drawing Figures

PATENTED OCT 3 1972 3,695,697

TO INERTIA RETRACTOR   ANCHORING MEANS

INVENTOR
ROBERT W. STOFFEL
BY

ATTORNEY

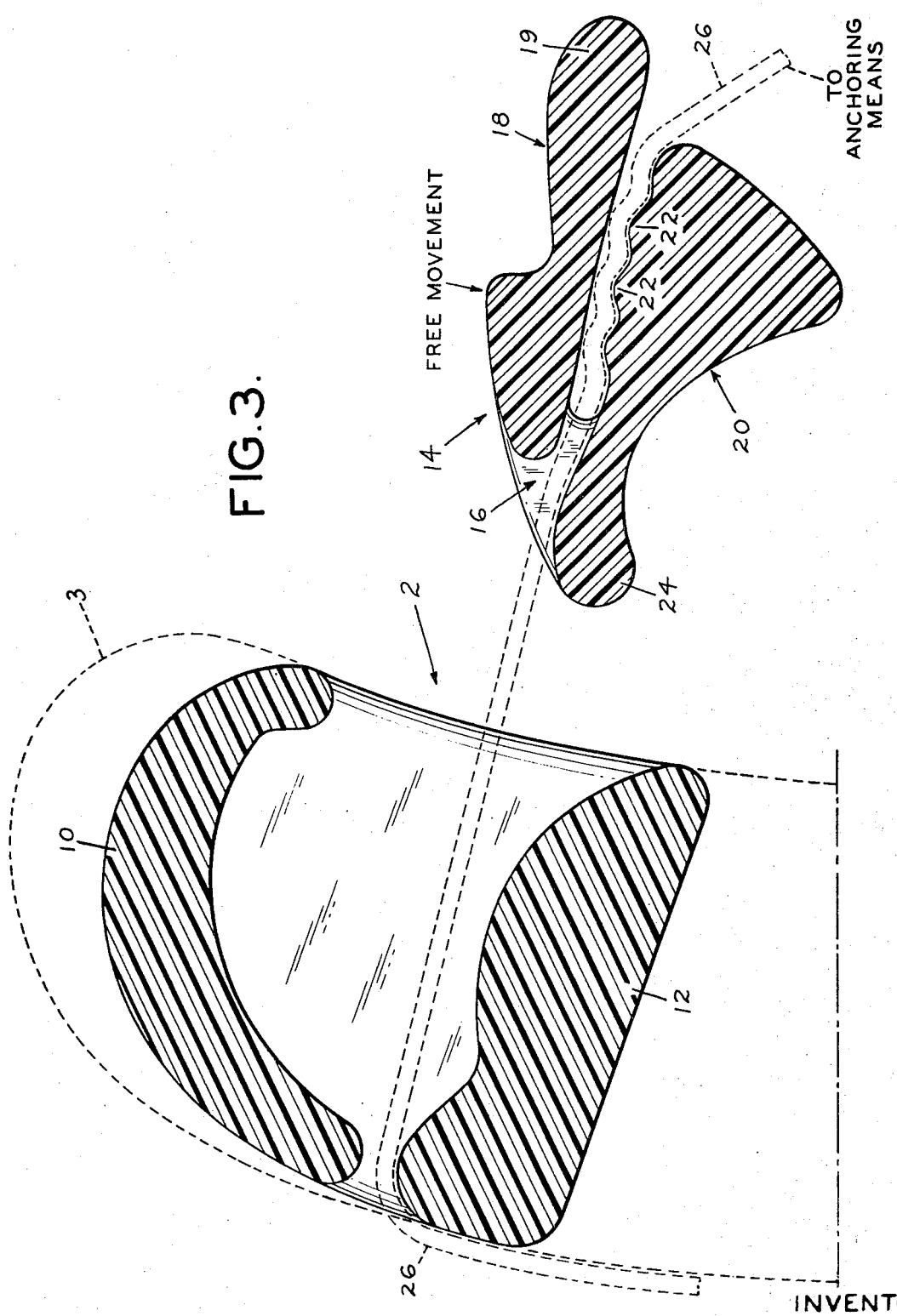

CONTROLLED MEMORY KEEPER

This invention relates to a device of specific configuration which eliminates the continuous retracting force heretofore applied to the occupant of a motor vehicle by shoulder strap retractors which continuously bias the shoulder strap toward retraction during normal vehicle operation, and it facilitates convenient shoulder strap length adjustments.

In the following description, directional references such as forward, rearward, upward and downward are made with respect to an occupant of a motor vehicle while facing the forward direction of motion of the vehicle.

In the following description, "inertia retractor" refers to a shoulder strap retractor which permits gradual extensions of the shoulder strap, but upon sudden extension thereof, as for example an extension due to a sudden extension thereof, as for example an extension due to a sudden impact of the vehicle, the shoulder strap is locked by the retractor against further extension. The capability to allow gradual extensions of the shoulder strap is locked by the retractor against further extension. The capability to allow gradual extensions of the shoulder strap is desirable during normal operation of the vehicle, to permit the occupant to move forward as for example to adjust a control setting on the control panel, while he is using the shoulder strap as a restraining device.

Safety seat belt restraint systems, which generally include a lap belt and a shoulder strap, are widely employed in motor vehicles as restraining devices. The shoulder strap is pulled from an inertia retractor which in one embodiment, is mounted within a vehicle, for example in the seat provided for the occupant, and emerges from an opening above and to the rear of the occupant. The end of the shoulder strap has engaging means which facilitates connection to the lap belt or to other anchoring means. The retractor from which the shoulder strap is pulled is generally biased as to continually apply a force urging the shoulder strap to retract and move into the retractor. When the shoulder strap is extended and is in the restraining position, this force tends to pull the occupant back against the rear of the seat. This prolonged pull has proven to be very tiring to the occupant.

In order to overcome this problem in the past in one embodiment, a clip-like gripping device is disposed on the shoulder strap and the occupant pulls the shoulder strap to the desired extended position and adjusts the gripping device to a selected position along the shoulder strap. The gripping device engages the entrance to the retractor to prevent or limit retraction of the shoulder strap thereby relieving the biasing pressure of the inertia retractor from the occupant.

This type of clip-like gripping device has certain disadvantages in that it requires manual adjustments to be made by the occupant to pre-selected positions along the strap. The occupant must extend his arm in an overhead and rearward position toward the gripping device in order to position it along the shoulder strap to adjust the strap to a suitable length. This procedure does not insure quick and accurate shoulder strap adjustments and in many instances it must be repeated several times before the shoulder strap is properly set to the desired length.

Accordingly, an object of the present invention is to provide an apparatus for use with inertia type shoulder restraint belts, which apparatus permits the occupant to move forward at will during normal operation of the motor vehicle while preventing shoulder strap retraction beyond a pre-selected length.

Another object of the present invention is to provide an apparatus for use with inertia-type shoulder restraint belts which apparatus facilitates quick and accurate shoulder strap length adjustments without requiring the occupant to assume uncomfortable positions to accomplish said adjustments.

These objects are accomplished in the present invention in which a gripping device, hereinafter referred to as a keeper, is located in its normal position in a seat receptacle provided for said keeper at a location which is above and to the rear of the occupant. The keeper, which may be constructed of a resilient synthetic resinous material in one embodiment, is provided with a passageway, defined by an upper flange and a lower flange, through which the shoulder strap passes after it emerges from an opening in the seat receptacle. The passageway in the keeper has a normal thickness which is less than the thickness of the shoulder strap belt element to permit the keeper to grip the belt element at a pre-selected position along the shoulder strap. To improve the grip of the keeper on the shoulder strap at least one surface of the passageway is roughened by suitable means, as for example, by providing gripping teeth on the surface. The resilient quality of the material from which the keeper is made thus provides a grip on the shoulder strap which grip may be released by spreading the upper and lower flanges which define the passageway. The configuration of the keeper and the seat receptacle are made to complement each other so that the keeper may be seated in a normal position within the seat receptacle while the shoulder strap is gripped in the keeper and is used as a restraining device by the occupant. The configuration of the keeper includes a projection on the forward end of the upper flange by which the keeper may be rotated upwardly when the shoulder strap, which is gripped in the passageway, is lifted upwardly and engages the projection. The seat receptacle, which in one embodiment, may be constructed of a resilient synthetic resinous material for example, has a preferred configuration which provides downward rotational resistance to the keeper at specific locations thereon when it is rotated upwardly by lifting the shoulder strap upwardly. The upward movement of the shoulder strap and keeper causes the upper and lower flanges of the keeper to spread thereby releasing the shoulder strap of the grip of the keeper. When the grip of the keeper on the shoulder strap is thus released, the occupant may pull the shoulder strap forwardly to extend the length thereof or he may permit the shoulder strap to be retracted by the retracting device to facilitate a reduction of the shoulder strap length.

After the occupant selects a suitable shoulder strap length the belt element is extended downward across the upper portion of the occupant's body and the end thereof is connected to the anchoring means generally provided for in the lap belt buckle or in the lower portion of the motor vehicle, for example. The keeper is located within the seat receptacle in a preferred embodiment, while gripping the shoulder strap during normal operation of the motor vehicle. The specific configurations of the seat receptacle when the occupant moves forward during operation of the motor vehicle. When the occupant moves rearward and the keeper engages the seat receptacle the shoulder strap retracting force is transmitted from the shoulder strap and keeper to the seat receptacle. Thus the occupant is relieved of the necessity of having to sustain the continuous retracting force of the shoulder strap retractor, except during time intervals in which he remains in a forward position.

The occupant is also relieved of the necessity to assume uncomfortable positions to select the desired length of the shoulder strap belt element. By merely lifting the shoulder strap upwardly and forwardly the grip of the keeper is released to facilitate quick shoulder strap length adjustments.

The configurations of the keeper and the seat receptacle also preclude further retraction of the shoulder strap by the engagement of the keeper with the seat receptacle while the shoulder strap is gripped therein.

When the shoulder strap is used as a restraining device and the keeper is seated within the seat receptacle while gripping the shoulder strap, a sudden impact or deceleration of the vehicle programs the inertia retractor to function in its normal manner preventing further extension of the shoulder strap thereby holding the occupant in place against the backrest of the vehicle seat.

These and other objects and features of this invention will become apparent in the following description in conjunction with the attached drawings in which.

FIG. 3 labeled "Free Movement" is a cut away view of the keeper after the occupant moves forward and the shoulder strap causes the keeper to move forward therewith.

Figure 4:
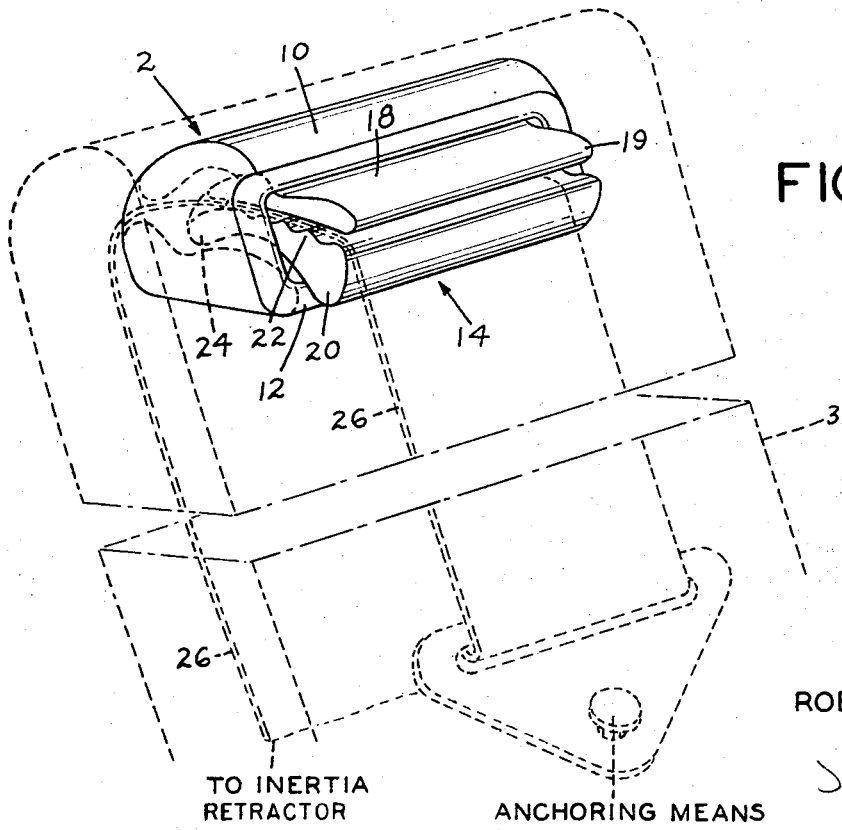

FIG. 4 is a perspective view of the shoulder strap emerging from its retractor with the keeper gripped thereon.

Figure 1:
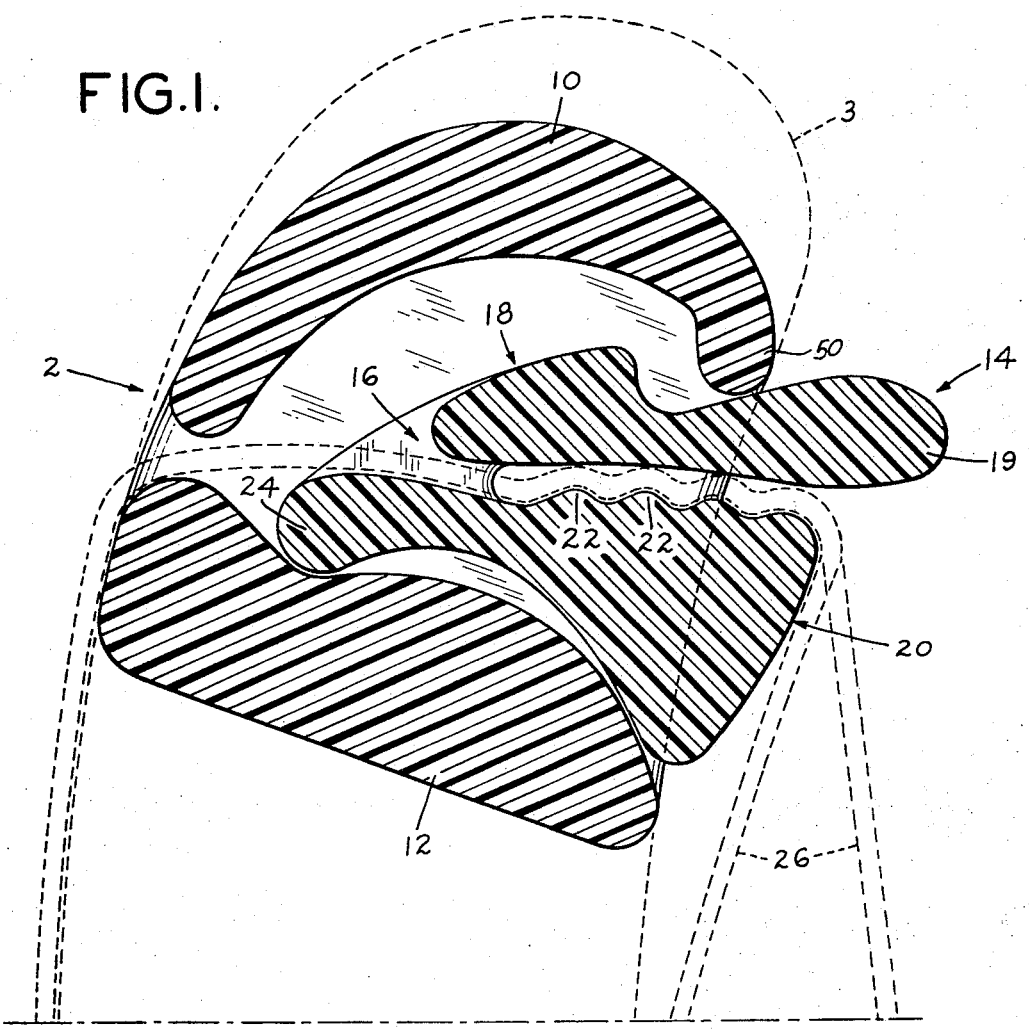
FIG. 1 is a cut away view of the keeper in the normal position in the seat receptacle provided therefor.

Referring to the drawings there is disclosed in FIG. 1 a seat receptacle 2 in a vehicle seat 3, said receptacle having an opening defined by an upper lip 10 and a lower extremity 12. The seat receptacle 2 is generally intended to be located in an upward and rearward location in relation to the occupant of the vehicle. For example in a motor vehicle the seat receptacle 2 may be located in the upper portion of the backrest provided for the occupant, and an inertia retractor may be mounted within the vehicle seat. The upper lip 10 and lower extremity 12 of the seat receptacle as well as the keeper 14 may be constructed of various materials but is preferably made of a molded resilient synthetic resinous material, for example, nylon, polyester and the like. The keeper 14 has a passageway 16 extending therethrough, an upper flange 18 and a lower flange 20. The passageway 16 has a normal thickness which is less than the thickness of the shoulder strap belt element to facilitate a grip by the keeper on the belt element at a pre-selected location along the shoulder strap. The lower surface of the passageway which comprises part of the lower flange is roughened by suitable means, as for example, gripping teeth 22, to improve the grip which the keeper imposes upon the shoulder strap belt element inserted therethrough. However other suitable roughening means which tend to increase the grip of the keeper may be utilized, or said roughening means may alternatively be disposed on both the upper and lower surfaces of the passageway, or on just the upper surface of the passageway. At the rear of the lower flange 20 of the keeper 14 is a projection, hereinafter referred to as a rear toe 24. At the forward portion of the upper flange 18, is a projection 19 which causes the keeper to rotate upwardly on the lip 50 when the shoulder strap is lifted upwardly and forwardly and engages the projection.

The shoulder strap 26 extending through the keeper is pulled upwardly and forwardly for extension thereof by the occupant. This shoulder strap movement pivots the keeper 14 upwardly to the position shown in FIG. 2. This movement forces the upper flange 18 upwardly and it forces the rear toe 24 into engagement with the lower extremity 12 of the seat receptacle opening, thereby spreading the upper and lower flanges 18 and 20 of the keeper 14 apart and out of their normal positions to allow the free movement of the strap 26 out through the keeper. The occupant pulls the strap 26 outwardly the desired distance and then moves the end thereof downwardly for connection to the anchoring means. Upon moving the end of the strap 26 downwardly for connection to the anchoring means the keeper is rotated to the normal position illustrated in FIG. 1. When the keeper is rotated back to said position the resilient quality of the preferred construction material of the keeper causes the upper and lower flanges 18 and 20 respectively, to return to their normal gripping positions by moving together to clamp the seat belt 26 therebetween. When the keeper 14 is in the position illustrated in FIG. 1 and the shoulder strap 26 is connected to the anchoring means at or near the lower portion of the vehicle the occupant may lean forwardly thereby extending the shoulder strap 26 out of the opening in the seat receptacle 2 and the keeper 14 will move with the shoulder strap 26 to a position such as that illustrated in FIG. 3 which is labeled "Free Movement".

During normal operation of the motor vehicle the keeper is in the position illustrated in FIG. 1 and the retracting force of the inertia retractor 28 is transmitted by means of the shoulder strap 26 through the keeper 14 to the seat receptacle 2 by the engagement of the keeper 14 with the seat receptacle 2. At the instant that the keeper 14 detaches from the seat receptacle 2 when the occupant moves forward, the retracting force of the inertia-type retractor 28 is transferred to the occupant. The occupant sustains the force of the inertia-type retractor 28 as long as he remains in a forward position and the keeper remains detached from the seat receptacle. When the occupant resumes his normal operating position by moving backward against the the backrest of the vehicle seat the shoulder strap 26 is retracted by the retracting force of the inertia retractor 28 until the keeper, which is gripped to the shoulder strap, re-engages the entrance to the seat receptacle. At this instant the continuous retracting force of the inertia retractor 28 is again transmitted by means of the shoulder strap 26 through the keeper 14 to the seat receptacle 2 by the engagement of the keeper 14 with said seat receptacle 2.

The prolonged pull which was heretofore tiring to the occupant is eliminated by the absorption of the retracting force by the seat receptacle 2 when the keeper 14 engages the upper flange 10 and the lower extremity 12 of the seat receptacle 2. The occupant may readily extend the length of the shoulder strap by merely grasping the belt element and rotating it upwardly and pulling it forwardly to the approximate desired length. Fine adjustments may be made by repeating the upward and forward motion of the shoulder strap in minor increments until the desired length is obtained. It is further seen that the occupant may readily reduce the length of the shoulder strap by merely grasping the belt element and rotating it upwardly and forwardly and permitting the shoulder strap to be retracted by the retracting force of the inertia-type retractor. The keeper will return to its normal operating position when the occupant rotates the shoulder strap downward and affixes it to the anchoring means at or near the lower portion of the motor vehicle.

Figure 2:
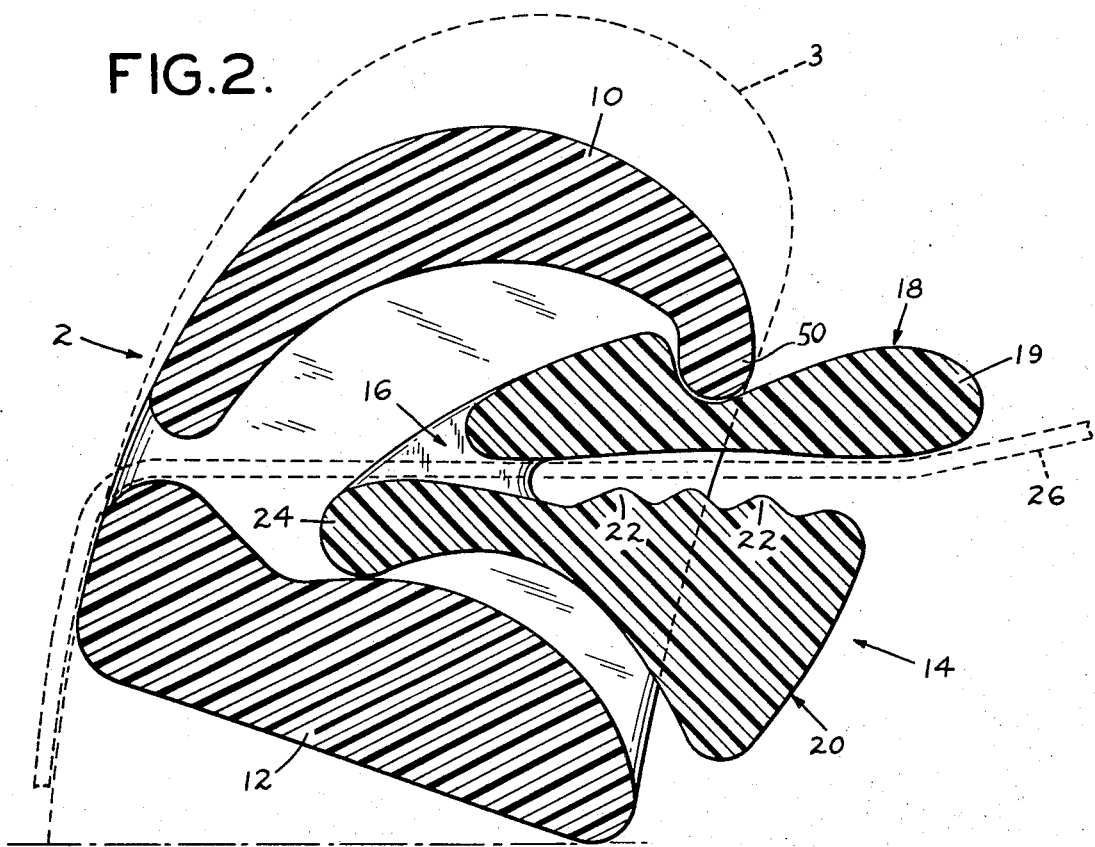
FIG. 2 is a cut away view of the keeper in the rotated position in which the grip of the keeper is released thereby facilitating adjustments of the shoulder strap.

When the shoulder strap 26 is no longer required the occupant may grip it and pull it upwardly and forwardly thereby pivoting the keeper 14 to the position shown in FIG. 2, and spreading the upper and lower flanges 18 and 20 of the keeper 14 apart and out of their normal positions to allow the free movement of the strap 26. The occupant may then permit the inertia retractor to retract the shoulder strap to a stored position therein. It is recognized that in certain seat belt restraint systems the thickness of the passageway 16 may not permit full retraction of the shoulder strap 26 and the hardware which may be utilized at the end thereof, as for example a tongue which may be used for anchoring the end of the shoulder strap 26 to the vehicle. This may cause the part of the shoulder strap 26 and hardware attached thereto, which is not retracted to a stored position to remain exposed in full view within the vehicle. In this situation, means may be provided to anchor the free end of the shoulder strap and hardware which may be connected thereto to a vehicle component as for example by utilizing a button or clip device to anchor the shoulder strap or hardware at the end thereof to the vehicle seat.

Although I have disclosed but one preferred embodiment of the present invention, it will be obvious to one skilled in the art that many changes and modifications may be made therein without departing from the spirit of the invention.

What is claimed is:

1. In a safety seat belt assembly mounted in a vehicle, the combination comprising:
   a. a flexible belt element having one end connected to a retracting means in a vehicle seat which retracting means continuously yieldably urges retraction of said belt element into the vehicle seat, an opposite end having means to anchor said belt element to the vehicle, and an intermediate section for extension over a vehicle occupant's body for restraining the occupant against sudden impact of the vehicle;
   b. a gripping device having a passageway for extending said belt element therethrough, said gripping device having means to grip said belt element in the passageway at a selected location;
   c. a seat receptacle accepting and retaining said gripping device in a normal position during operation of the vehicle, said receptacle being mounted overhead and rearward of the occupant, and said receptacle having an opening for extension therethrough of said belt element for connection to the retracting means;
   d. means in said receptacle for engaging said gripping device while said belt element is gripped therein, the engagement preventing retraction of said belt element beyond a pre-determined length;
   e. projection means on said gripping device for releasing the grip of said gripping device on said belt element as a result of rotation of said device upward and forward in said receptacle; and
   f. said means in said seat receptacle permitting said gripping device to move forward out of engagement with said receptacle while the belt element is gripped therein and extended over occupant's body to the anchoring means, said gripping device forward movement allowing occupant to move forward during operation of the vehicle.

2. The invention as defined in claim 1, wherein said gripping device comprises an upper flange and a lower flange having unitary construction, said flanges defining the passageway through which the flexible belt element extends.

3. The invention as defined in claim 2 wherein said gripping device is constructed of a resilient material.

4. The invention as defined in claim 3 wherein at least one surface of the passageway has roughening means and the thickness of the passageway is less than the thickness of the belt element, the passageway thickness and surface roughening means facilitating a grip on said belt element.

5. The invention as defined in claim 4 wherein said resilient material is a molded synthetic resin.

6. The invention as defined in claim 5 wherein said roughening means comprises a series of lateral notches formed on the surface and extending across the width of the passageway.

7. The invention as defined in claim 6 wherein said receptacle is constructed of a molded synthetic resinous material.

8. In a safety seat belt assembly mounted in a motor vehicle, the combination comprising:
   a. a flexible belt element having one end connected to a retracting means mounted within a motor vehicle seat, the retracting means continuously yieldably urging retraction of said belt element into the vehicle seat, an opposite end having means to anchor said belt element to the motor vehicle, and an intermediate section for extension thereof over a vehicle occupant's body for restraining the occupant against sudden impact of the motor vehicle;
   b. a gripping device of a resilient molded synthetic resinous material, which gripping device has an upper flange and a lower flange defining a passageway therethrough through which said belt element extends, the passageway having a thickness which is less than the thickness of the belt element thereby causing the gripping device to grip the belt element at a selected location;

c. a continuous series of lateral notches formed on at least one surface of the passageway and extending across the width thereof to assist the gripping device in gripping the belt element;

d. a projection on the rearward end of the lower flange adjacent to the passageway;

e. a projection on the forward end of the gripping device upper flange to facilitate the application of an upward rotational movement to the gripping device when the belt element is rotated upwardly and forwardly;

f. a seat receptacle having a lower extremity and an upper extremity constructed of a molded synthetic resinous material, said receptacle being mounted overhead and rearward of the occupant within a vehicle seat, the upper and lower extremities defining an opening for passage of the belt element therethrough for connection to the retracting means;

g. the seat receptacle lower extremity having a convex shape which substantially complements a concave shape of the lower surface of the gripping device lower flange for accepting said gripping device in a normal position during vehicle operation;

h. the upper extremity and lower extremity of said seat receptacle being positioned to engage said gripping device to prevent further movement thereof toward said seat receptacle, thereby preventing further retraction of said flexible belt element while it is gripped in the passageway;

i. a lip on the forward end of said seat receptacle upper extremity, said lip being positioned to engage the gripping device upper flange providing downward restraint thereon when the gripping device is rotated upwardly by the upward movement of the belt element, said movement causing the gripping device upper flange to move away from the gripping device lower flange when the rearward projection on the gripping device lower flange engages the convex lower extremity of the seat receptacle; and j. said seat receptacle having a configuration which permits the gripping device to move forward out of engagement with said seat receptacle while the belt element is gripped therein and the occupant moves forward during normal operation of the motor vehicle.

9. A gripping device having a passageway for extending a flexible seat belt element therethrough, said gripping device of resilient material including an upper flange and a lower flange having unitary construction, said flanges defining the passageway through which the flexible belt element extends, at least one surface of said passageway has roughening means and the thickness of the passageway being less than the thickness of the belt element, the passageway thickness and surface roughening means facilitating a grip on said belt element, said gripping device shaped for removable acceptance and retention in a receptacle in a vehicle during normal operation thereof, and means on said gripping device for releasing the grip of said gripping device on said belt element as a result of rotation of said device upward and forward in said receptacle.

10. A gripping device of a resilient molded synthetic resinous material for reception in a receptacle, which comprises:

a. an upper flange and a lower flange defining a passageway therethrough through which a belt element extends, said passageway having a thickness which is less than the thickness of the belt element thereby causing said gripping device to grip the belt element at a selected location;

b. a continuous series of lateral notches formed on at least one surface of said passageway and extending across the width thereof to assist said gripping device in gripping the belt element;

c. a projection on the rearward end of said lower flange adjacent to the passageway; and d. a projection on the forward end of said gripping device upper flange to facilitate the application of an upward rotational movement to said gripping device in the receptacle when the belt element is rotated upwardly and forwardly causing said gripping device upper flange to move away from said gripping device lower flange when the projection on the rearward end of said gripping device lower flange engages the receptacle.

* * * * *